United States Patent [19]

Cole, Jr. et al.

[11] 4,115,876
[45] Sep. 26, 1978

[54] SELF-CONTAINED RECIRCULATING TOILET SYSTEM

[75] Inventors: William Cole, Jr., Oakland; William R. Preis, River Edge, both of N.J.

[73] Assignee: Cole Resdevel Corp., Fairlawn, N.J.

[21] Appl. No.: 744,873

[22] Filed: Nov. 24, 1976

[51] Int. Cl.² .............................................. E03D 5/016
[52] U.S. Cl. .......................................... 4/317; 4/319; 4/320; 4/321; 210/60; 210/152; 210/167
[58] Field of Search .................... 4/10, 115, 78, 76, 89, 4/80, 77, 79; 204/275; 210/60, 152, 167

[56] References Cited

U.S. PATENT DOCUMENTS

| | | | |
|---|---|---|---|
| 2,798,228 | 7/1957 | Boester | 4/10 |
| 3,079,612 | 3/1963 | Corliss | 4/10 |
| 3,579,646 | 5/1971 | Lekberg | 4/10 |
| 3,624,665 | 11/1971 | Klingle | 4/115 |
| 3,633,218 | 1/1972 | Lekberg | 4/10 |
| 3,728,245 | 4/1973 | Preis et al. | 204/275 |
| 3,824,632 | 7/1974 | Bach et al. | 4/12 |
| 3,922,730 | 12/1975 | Kemper | 4/10 |
| 3,939,499 | 2/1976 | Roberts | 4/10 |
| 3,974,528 | 8/1976 | Claunch et al. | 4/10 |
| 4,009,104 | 2/1977 | Behrendt | 210/152 |
| 4,017,395 | 4/1977 | Davis | 210/167 |
| 4,040,956 | 8/1977 | Selwitz | 210/60 |

Primary Examiner—Henry K. Artis
Attorney, Agent, or Firm—Charles E. Brown

[57] ABSTRACT

This disclosure relates to a self-contained recirculating toilet system which includes a toilet bowl having a built-in flush pump and a waste-discharge macerator pump with the discharge of the macerator pump being connected to a holding tank unit for delivering raw waste into a raw-waste compartment thereof. The raw waste is periodically pumped from the raw-waste compartment to a combined sterilization and flocculation cell unit after which the treated liquid is returned to the holding-tank unit and after solids float over weir by virtue of gaseous suspension from the treatment in the cells and aided by the outward flow through a discharge slit the remaining clarified and sterilized liquid is directed into a flush-water compartment of the holding-tank unit for use in the next flushing of the toilet. The system provides for repeated use of the same water for multiple toilet flushing.

11 Claims, 4 Drawing Figures

SELF-CONTAINED RECIRCULATING TOILET SYSTEM

This invention relates in general to new and useful improvements in toilets, and more particularly to a recirculating toilet.

In recreation vehicles of the camping and marine type, waste disposal presents a serious problem. While holding tanks have been developed, of necessity because of space and weight limitations, their sizes have been restricted. As a result, the recreation vehicles can operate only for a limited period of time before the holding tanks must be emptied.

In accordance with this invention, there is provided a toilet system wherein the same water which is utilized to flush the toilet is reusable over, and over with the raw waste being treated so as to reduce to a minimum the solids which must be retained in the system. Basically the solids, when treated, are transformed into gases including oxygen, chlorine, carbon dioxide and hydrogen. Further, sufficient residual chlorine remains present to keep the entire system odor free and hygienically safe. The water, separated from the solids, is recirculated.

In accordance with this invention, there is provided a standard marine-type toilet bowl which has a built-in flush pump and a waste-discharge macerator pump so that the toilet may be operated electrically and the waste thereof is thoroughly macerated before it is discharged. The macerated raw waste passes into a holding tank unit and then is pumped through a cell unit wherein it is electro-chemically treated so as to effect sterilization of the waste liquid and solids, and flocculation and separation of the solids. The treated waste is then returned into the holding-tank unit, wherein the solids are separated from the water and the water is directed into a flush-water compartment for re-use.

The build-up of solids is relatively slow, with the result that the system may be utilized over and over a large number of times before cleaning thereof is required.

With the above and other objects in view as will hereinafter appear, the nature of the invention will be more clearly understood by reference to the following detailed description, the appended claimed subject matter, and the several views illustrated in the accompanying drawings.

IN THE DRAWINGS

Figure 1:
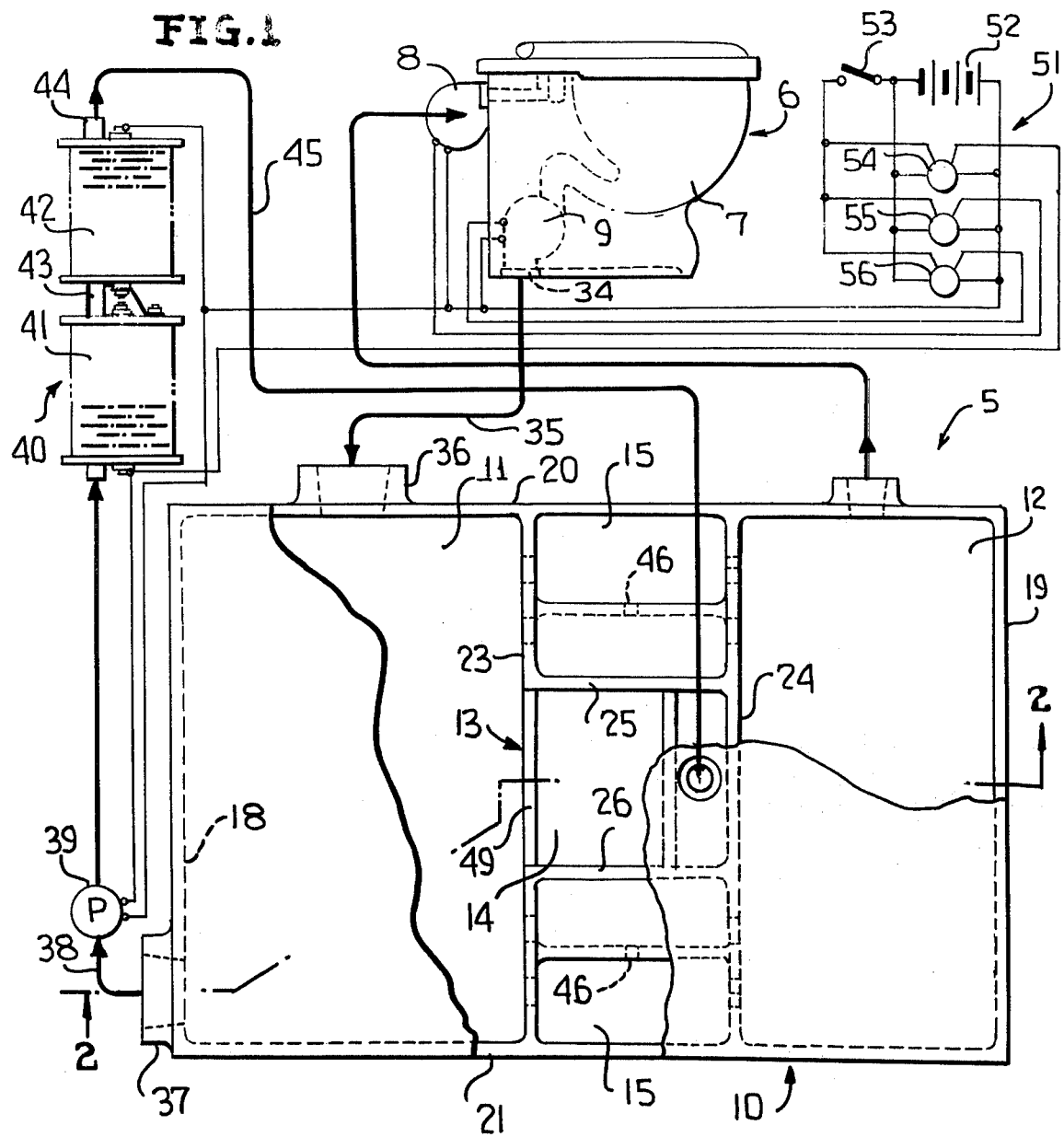
FIG. 1 is a schematic view showing the overall system and specifically illustrating the details of the holding tank unit, which is shown in plane view.

Referring now to the drawings in detail, it will be seen that the overall system is schematically illustrated in FIG. 1, the toilet system being generally identified by the numeral 5. The toilet system 5 includes a toilet, generally identified by the numeral 6, which is in the form of a conventional marine toilet bowl 7 having a conventional flush pump 8 and a conventional macerator pump 9.

The toilet system 5 also includes a holding-tank unit, generally identified by the numeral 10. The holding tank unit 10 is preferably in the form of a unitary structure divided into a plurality of compartments, although each of the compartments could be in the form of a separate tank. The holding tank unit 10 includes a raw-waste compartment 11 disposed at one end of the unit 10 and a flush water compartment 12 disposed at the opposite end thereof. Disposed between the raw-waste compartment 11 and the flush water compartment 12 is a flotation separation compartment, generally identified by the numeral 13. The compartment 13 extends the full width of the holding-tank unit 10 between the compartments 11 and 12 and includes a main compartment 14 which is centrally located, and a pair of auxiliary compartments 15 disposed on opposite sides thereof.

Figure 3:
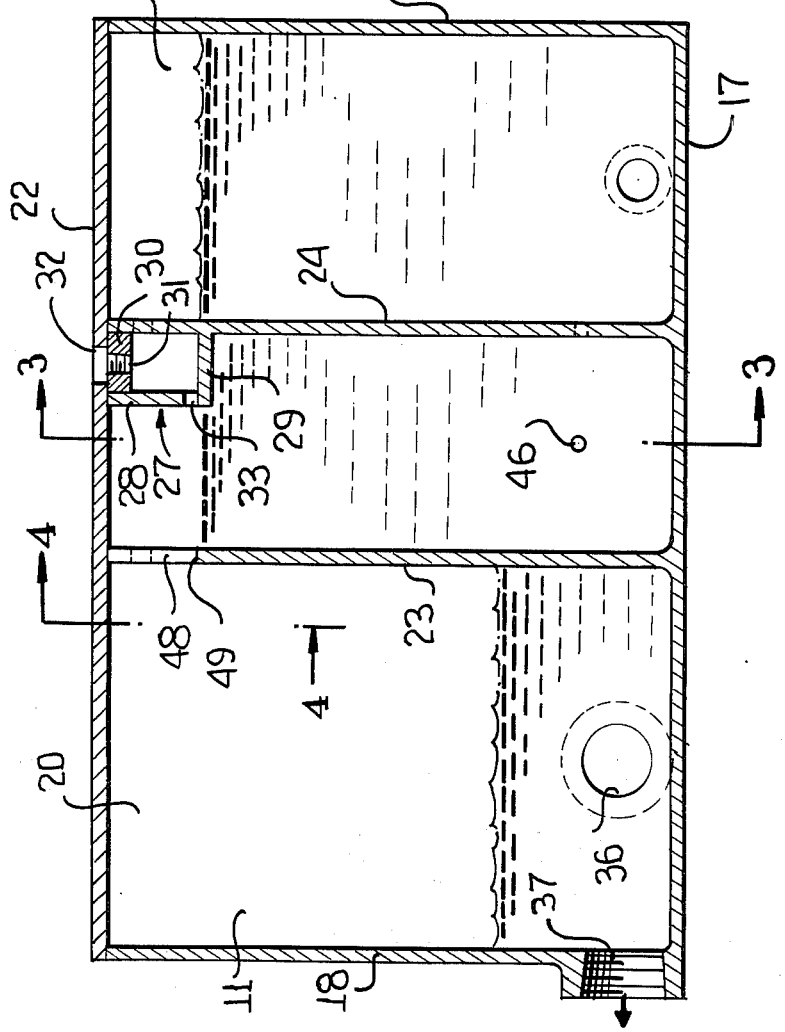
FIG. 3 is a transverse vertical sectional view taken through the tank along the line 3—3 of FIG. 2 and shows further details of the tank.

With particular reference to FIG. 3, it will be seen that the main compartment 14 is generally trapezoidal in outline and tapers upwardly from a wide bottom to a narrow top. The auxiliary compartments 15 taper downwardly, each having a wide top and a narrow bottom. The combined widths of the main and auxiliary compartments at the top and bottom thereof are substantially equal so that the overall compartment 13 is rectangular and of the same general cross-section as the compartments 11 and 12.

When the holding-tank unit 10 is in the form of a single tank, the various compartments 11 through 15 will be defined by a bottom wall 17, end walls 18 and 19, side walls 20 and 21 and a top wall 22. Extending between the side walls 20 and 21 are transverse partition walls 23 and 24 which define the compartments 11, 12 and 13. Also, as is best shown in 1, extending between the transverse partition walls 23 and 24 are longitudinal partition walls 25 and 26 which divide the compartment 13 into the main compartment 14 and the auxiliary compartments 15.

It is to be understood that the top wall 22 is removable and is secured in place in sealed relation to the walls 18, 19, 20 and 21 in any desired manner to facilitate cleaning of the holding-tank unit 10.

It is also to be noted that the main compartment 14 is provided with an entrance receptacle, generally identified by the numeral 27. The entrance receptacle 27 extends across the top of the main compartment, and one wall thereof is formed by an upper part of the transverse partition wall 24. Parallel to the wall 24 is a wall 28. Connecting together the walls 24 and 28 is a bottom wall 29 which also extends between the walls 25 and 26. The walls 25 and 26 form opposite ends of the receptacle 27. Finally, the receptacle 27 has its own top wall 30. The top wall 30 is provided with an internally threaded inlet 31 which is aligned with an opening 32 in the top wall 22. It is to be noted that the wall 28 terminates above the wall 29 so as to define a discharge slit 33 opening from the receptacle 27.

It is to be understood that the toilet bowl 7 includes a conventional discharge, generally identified by the numeral 34. The waste output 34 receives a discharge from the macerator pump 9 and directs the same into piping 35 which, in turn, is coupled to a fitting 36 carried by the side wall 20 and opening into the raw-waste compartment 11 near the bottom thereof.

The end wall 18 has a fitting 37 disposed remote from the fitting 36, and coupled thereto is piping 38. Incorporated in the piping 38 is a pump 39. The piping 38 leads to a sterilization and flocculation and separation cell unit, generally identified by the numeral 40. The cell unit is most specifically disclosed in our U.S. Pat. No. 3,728,245, granted Apr. 17, 1973. Accordingly, the specific details of the cell unit 40 and the function of the individual cells 41 and 42 thereof will not be described in detail here. It is to be noted, however, that the cells 41 and 42 are coupled in series by means of piping 43.

Treated waste material discharges from the cell 42 as at 44 into piping 45, which is coupled to the threaded bore 31 and leads into the receptacle 27.

Liquid received in the receptacle 27 flows through the discharge slit 33 into the main compartment 14 and then passes from the main compartment 14 transversely into the auxiliary compartments 15 through submerged relatively small openings 46. The liquid (primarily water) then passes from the auxiliary compartments 15 into the flush water compartment 12 through small, submerged openings 47 in the transverse partition wall 24.

Figure 4:
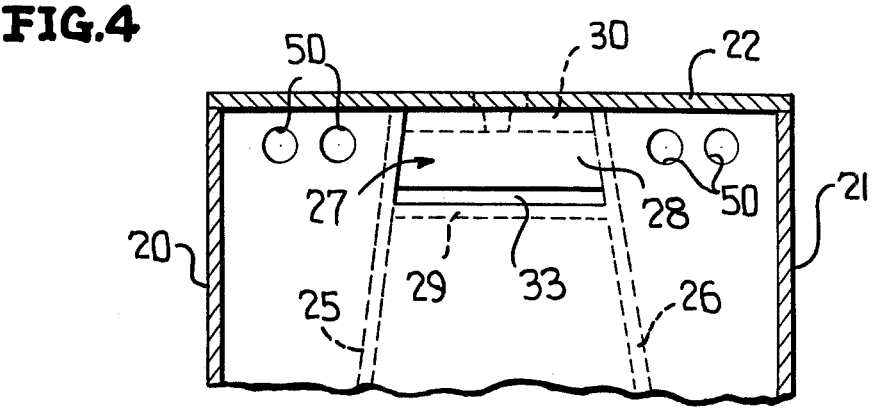
FIG. 4 is a fragmentary transverse vertical sectional view taken along the line 4—4 of FIG. 2.
Figure 2:
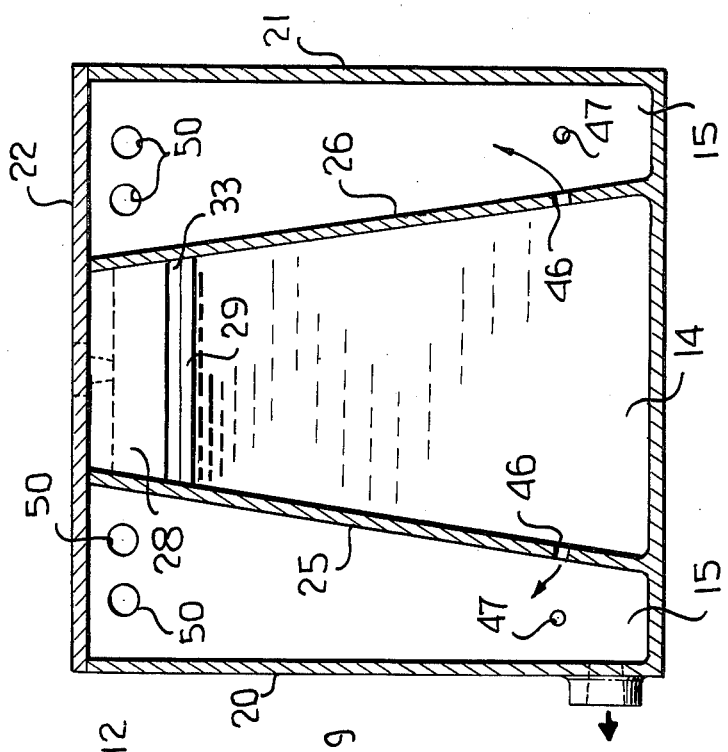
FIG. 2 is a vertical sectional view taken through the holding-tank unit generally along the line 2—2 of FIG. 1.

With particular reference to FIGS. 2 and 4, it will be seen that the upper part of that portion of the transverse partition wall 23 which forms a wall of the main compartment 14 is removed so as to define a notch 48. The notch 48, in turn, defines a weir 49 over which liquid from the compartment 13 may flow into the raw-waste compartment 11 once the compartment 14 is filled to the level illustrated in FIG. 2. Compartments 15 will be filled at a later time in the treatment cycle by virtue of the slow drainage through openings 46. The flush-water compartment 12 is filled to it's full capacity at a still later time in the treatment cycle by slow drainage through openings 47.

As is best shown in FIGS. 3 and 4, suitable vent openings 50 are formed in the upper portions of the transverse partition walls 23 and 24 so as to place the auxiliary compartments 15 in communication with the raw-waste compartment 11 and the flush-water compartment 12.

Referring once again to FIG. 1, it will be seen that the toilet system 5 includes an electrical system, generally identified by the numeral 51. The electrical system 51 includes a source of electrical power 52 typically in the form of a battery. The electrical system 51 is controlled by means of a switch 53 which, when momentarily closed, will serve to energize timers 54, 55 and 56. The timer 54 controls the energization of the cells 41 and 42 and the pump 39 while the timer 55 controls the energization of the flush pump 8. The timer 56 controls the operation of the macerator pump 9. While separate timers 55 and 56 have been illustrated for separately controlling the operation of the flush pump 8 and the macerator pump 9, it is to be understood that a single timer could be utilized for controlling both pumps.

OPERATION

At the initial start-up, a small volume of water, approximately 6½ gallons, is placed in the holding-tank unit 10 by flowing it into the main compartment 14, with the same flowing into the auxiliary compartments 15 and the flush-water compartment 12. A small quantity of the water may flow into the raw-waste compartment 11.

If the water utilized is not salt water, a quantity of salt, which may be ordinary table salt, is added to bring the salinity of the solution to approximately 10% saturated, or equivalent to the salt content of ordinary sea water. The purpose of the sodium chloride (salt) in this system is to provide a source of chlorine by virtue of electrolysis. The 10% saturation of the salt is to provide the proper level of conductivity in the solution to keep the operation of the cell unit 40 within the power capabilities of a small vessel or autotrailer home. It has been found that any source of 12-volt direct-current power will suffice to operate not only the cell unit 40, but also the entire electrical system 51. Generally speaking, the power source 52 may be a standard 12-volt, 100-amphere-hour storage battery. Pumps 8, 9 and 39 preferably are powered by the 12-volt direct-current power source. However, the control of the cell unit 40 could be separate from that of the pumps, and thus the pumps could utilize an entirely different power supply.

After the toilet 6 is used, it is flushed within seconds, this being controlled by the timer 55. The flush water comes from the flush-water storage compartment 12. The same instant that the flush begins, the circulating pump 39 starts pumping waste from the raw-waste compartment through the cell unit 40 which is also energized at the start of the flush. When the raw waste is within the cell units, it is acted upon in the manner described in our U.S. Pat. No. 3,728,245, and gases, including oxygen, chlorine and hydrogen, are produced due to the electrolytic action on the salt and water.

The recirculation of the waste from the raw-waste compartment 11 through the cell unit 40 continues for a time on the order of 2½ minutes.

The treated raw waste from the cell unit 40 enters into the separation compartment 13. During this time as the treated solution enters the separation unit, tiny gas bubbles attach themselves to the multitude of suspended solid particles which are diffused through the treated solution, thus causing the solid particles to rise as they are emptied into the separation compartment. As the solid particles reach the surface level established in the main compartment 14, they flow over the weir 49 back into the raw-waste compartment 11. At the same time, a small portion of the chlorinated and clarified liquid settles out and passes downwardly and through the openings 46 into the auxiliary compartments 15, which function as stabilization chambers. From the auxiliary compartments 15, the clarified water passes slowly through the submerged openings 47 into the flush-water compartment 12, thus gradually refilling the flush-water compartment 12 to its maximum capacity to be ready for the next flush cycle.

It has been found that after the 2½ minute treatment is completed, all of the waste water treated is sufficiently chlorinated to kill all bacteria therein and thus reduce the coliform count to zero throughout the system. Sufficient residual chlorine is present to keep the entire system odor free and hygienically safe.

It has been found that this system may be operated for several months without any cleaning or recharging. When recharging becomes necessary, the sterile solids that have been accumulated may be easily disposed of without any health hazards after the cover or top wall 22 has been removed. During use, much of the waste volume has dissipated in the form of odorless gas.

It will be readily apparent that no provision is made for the discharge of the waste from the system except by cleaning. Thus no waste may be discharged in such a way as to harm the environment. It is appreciated that in view of the change of volumes within the system 5 when the toilet 6 is actuated, and further in view of the formation of gases within the holding-tank unit 10, a suitable vent (not shown) should be formed in the top wall 22.

Although only a preferred embodiment of our toilet system has been specifically illustrated and described herein, it is to be understood that minor variations may be made therein without departing from the spirit and scope of the invention, as defined by the appended claims.

I claim:

1. A self-contained recirculation waste system comprising a disposal unit of the type including a flush system having an inlet and a discharge system having an outlet, a holding tank unit, a sterilization cell unit, said holding tank unit including a flush water compartment and a raw waste compartment; and plumbing means coupling said discharge system outlet to said raw waste compartment, said raw waste compartment to said cell unit, said cell unit to said flush water compartment, and said flush water compartment to said flush system inlet, said holding tank unit including a flotation separation compartment coupled between said cell unit and said flush water compartment.

2. The recirculating waste system of claim 1 wherein said sterilization cell unit is of the type for effecting separation and flocculation of solids within the treated raw waste.

3. The recirculating waste system of claim 1 wherein said flotation separation compartment is physically disposed between said raw waste compartment and said flush water compartment.

4. The recirculating waste system of claim 1 wherein said flotation separation compartment is physically disposed between said raw waste compartment and said flush water comaprtment.

5. The recirculating waste system of claim 1 wherein said flotation separation compartment is physically disposed between said raw waste compartment and said flush water compartment, and is connected to said flush water compartment by normally submerged passages and to said raw waste compartment by an overflow passage, said flotation separation compartment including a main compartment and at least one auxiliary compartment disposed alongside said main compartment, respective ones of said submerged passages connecting said main compartment with each auxiliary compartment and each auxiliary compartment with said flush-water compartment.

6. The recirculating waste system of claim 5 wherein said main compartment tapers upwardly and said auxiliary compartment tapers downwardly.

7. The recirculating waste system of claim 6 wherein there are two of said auxiliary compartments, and the combined widths of said main and auxiliary compartments at top and bottom are substantially equal.

8. The recirculating waste system of claim 5 wherein said auxiliary compartment has upper vent openings in communication with said raw waste compartment and with said flush water compartment.

9. The recirculating system of claim 1 wherein said holding tank unit is in the form of a unitary structure.

10. The recirculating waste system of claim 1 wherein said disposal unit is a toilet and said discharge system includes a macerator.

11. A holding tank unit for use in a self-contained recirculation waste disposal system of the type utilizing a sterilization cell unit, said tank unit comprising a raw water compartment, said raw water compartment having an inlet for receiving raw waste water and an outlet for supplying raw waste water therefrom, a flush water compartment having an outlet for supplying recycled flush water, and a flotation separation compartment for receiving treated raw waste and water, said flotation separation compartment having an overflow discharge opening into said raw water compartment for separating and discharging floating waste and a submerged outlet opening into said flush water compartment for directing recycled water to said flush water compartment.

* * * * *